US008367928B2

(12) United States Patent
Hsu et al.

(10) Patent No.: US 8,367,928 B2
(45) Date of Patent: Feb. 5, 2013

(54) WATERPROOF MECHANISM AND ELECTRONIC DEVICE HAVING THE SAME

(75) Inventors: Po-Yuan Hsu, Taipei Hsien (TW); Hsing-Wang Chang, Taipei Hsien (TW); Chia-Cheng Su, Taipei Hsien (TW); Wei-Chen Wang, Taipei Hsien (TW); Tsung-Hsien Chen, Taipei Hsien (TW)

(73) Assignee: Wistron Corporation, Hsichih, Taipei Hsien (TW)

( * ) Notice: Subject to any disclaimer, the term of this patent is extended or adjusted under 35 U.S.C. 154(b) by 277 days.

(21) Appl. No.: 12/804,674

(22) Filed: Jul. 26, 2010

(65) Prior Publication Data

US 2011/0192625 A1 Aug. 11, 2011

(30) Foreign Application Priority Data

Feb. 9, 2010 (TW) .............................. 99202686 U

(51) Int. Cl.
*H05K 5/00* (2006.01)
(52) U.S. Cl. ......................... 174/50; 439/535; 248/906
(58) Field of Classification Search .................. 174/50, 174/58, 17 R; 439/535; 220/4.02; 248/906
See application file for complete search history.

(56) References Cited

U.S. PATENT DOCUMENTS

| 7,735,620 B2 * | 6/2010 | Swinderman | 193/34 |
| 7,785,138 B2 * | 8/2010 | Bonnassieux et al. | 439/535 |
| 8,067,690 B2 * | 11/2011 | Anders et al. | 174/50 |

FOREIGN PATENT DOCUMENTS

TW 532503 5/2003

OTHER PUBLICATIONS

English Abstract of TW Patent Publication No. 532505, published May 11, 2003 (1 page).

\* cited by examiner

*Primary Examiner* — Dhirubhai R Patel

(57) ABSTRACT

A waterproof mechanism includes a housing having a base wall, at least one door plate, a first waterproof seal, and at least one return spring. The base wall is formed with an opening. The door plate is connected movably to the base wall for closing the opening in the base wall. The door plate is pushable to perform a motion relative to the base wall to thereby open the opening. The first waterproof seal is disposed between the base wall and the door plate and around the opening so as to establish a water-tight seal between the base wall and the door plate. The return spring is disposed between the base wall and the door plate for biasing the door plate to close the opening.

26 Claims, 13 Drawing Sheets

WATERPROOF MECHANISM AND ELECTRONIC DEVICE HAVING THE SAME

CROSS-REFERENCE TO RELATED APPLICATION

This application claims priority of Taiwanese Application No. 099202686, filed on Feb. 9, 2010.

BACKGROUND OF THE INVENTION

1. Field of the Invention

This invention relates to a waterproof mechanism, and more particularly to a waterproof mechanism capable of opening or closing an opening through operation of at least one door plate and an electronic device having the same.

2. Description of the Related Art

In a notebook computer disclosed in Taiwanese Patent No. 532503 (Application No. 90221244), an outer housing is provided with a cover plate disposed at a side thereof. The cover plate includes a plurality of soft caps. When the user does not use input/output ports of the notebook computer, the cover plate can be disposed at a closed position and locked on the outer housing by a fastening device, such that the soft caps are plugged respectively into the input/output ports for waterproof purposes. When the user desires to use the input-output ports, the fastening device is first removed. Next, the cover plate is changed to an opened position to allow an electrical connector of an external electronic device to be engaged to one of the input/output ports.

Operation of the fastening device results in inconvenience during use of the notebook computer. Moreover, after use of the input-output ports, it is likely that the user forgets to close the cover plate. Further, when the electrical connector of the external electronic device is engaged to the one of the input/output ports, since no waterproof mechanism is provided therebetween, water may flow into the input/output ports.

SUMMARY OF THE INVENTION

An object of this invention is to provide a waterproof mechanism that includes a door plate designed to change from a closed position to an opened position as a result of an electrical connection and from the opened position to the closed position as a result of an electrical disconnection, thereby resulting in convenience during use of the waterproof mechanism.

Another object of this invention is to provide an electronic device having a waterproof mechanism that can provide a good waterproof effect and that includes a door plate designed to change from a closed position to an opened position as a result of an electrical connection and from the opened position to the closed position as a result of an electrical disconnection, thereby resulting in convenience during use of the electronic device.

According to an aspect of this invention, there is provided a waterproof mechanism comprising:

a housing having a base wall formed with an opening;

at least one door plate connected movably to the base wall for closing the opening in the base wall, the door plate being pushable to perform a motion relative to the base wall to thereby open the opening;

a first waterproof seal disposed between the base wall and the door plate and around the opening so as to establish a water-tight seal between the base wall and the door plate; and at least one return spring disposed between the base wall and the door plate for biasing the door plate to close the opening.

According to another aspect of this invention, there is provided an electronic device comprising:

a housing having a base wall formed with as opening;

an electrical connector disposed in the housing and aligned with said opening; and a waterproof mechanism including, at least one door plate connected movably to said base wall for closing said opening in said base wall, the door plate being pushable to perform a motion relative to the base wall to thereby open the opening, a first waterproof seal disposed between the base wall and the door plate and around the opening so as to establish a water-tight seal between the base wall and the door plate, and at least one return spring disposed between the base wall and the door plate for biasing the door plate to close the opening.

As such, when the opening is closed by the door plate, due to the presence of the first waterproof seal, access of water into the electrical connector is prevented. As a consequence, the electronic device is convenient to use.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
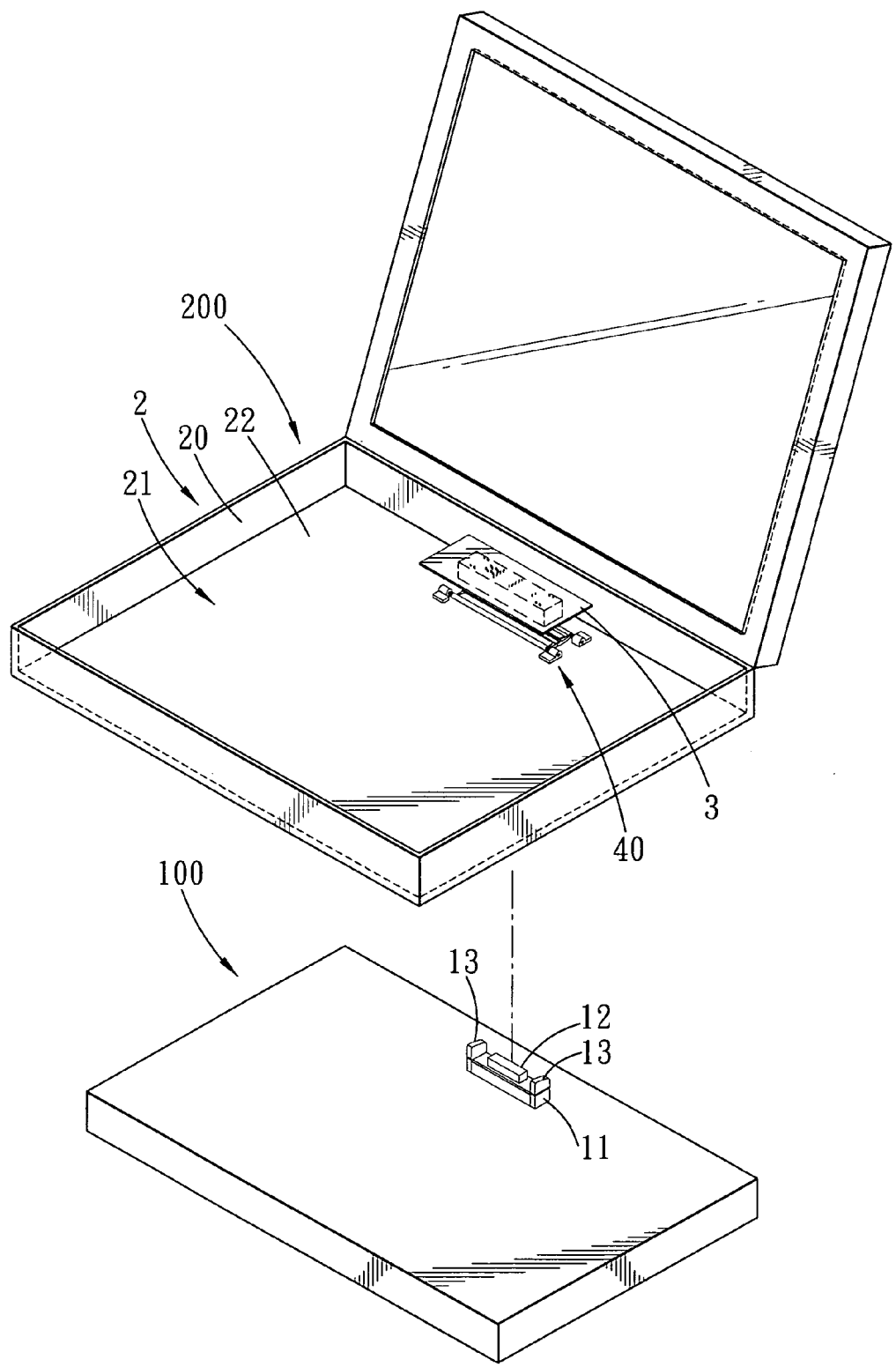
FIG. 1 is a partly exploded perspective view of the first preferred embodiment of an electronic device according to this invention.

Before the present invention is described in greater detail in connection with the preferred embodiments, it should be noted that similar elements and structures are designated by like reference numerals throughout the entire disclosure.

Referring to FIG. 1, the first preferred embodiment of an electronic device 200 according to this invention is adapted for connection with an external electronic device 100. In this embodiment, the electronic device 200 and the external electronic device 100 are exemplified using a notebook computer and a docking station, respectively. Alternatively, the electronic device 200 may be a panel computer, a personal computer, an industrial computer, a personal digital assistant, a mobile phone, or the like having input/output ports. In addition, the external electronic device 100 may be a thumb drive, a portable hard disk, a loudspeaker, or the like having input/output ports.

The external electronic device 100 includes a projection 11 and a first electrical connector 12 protruding from a top surface of the projection 11.

Figure 2:
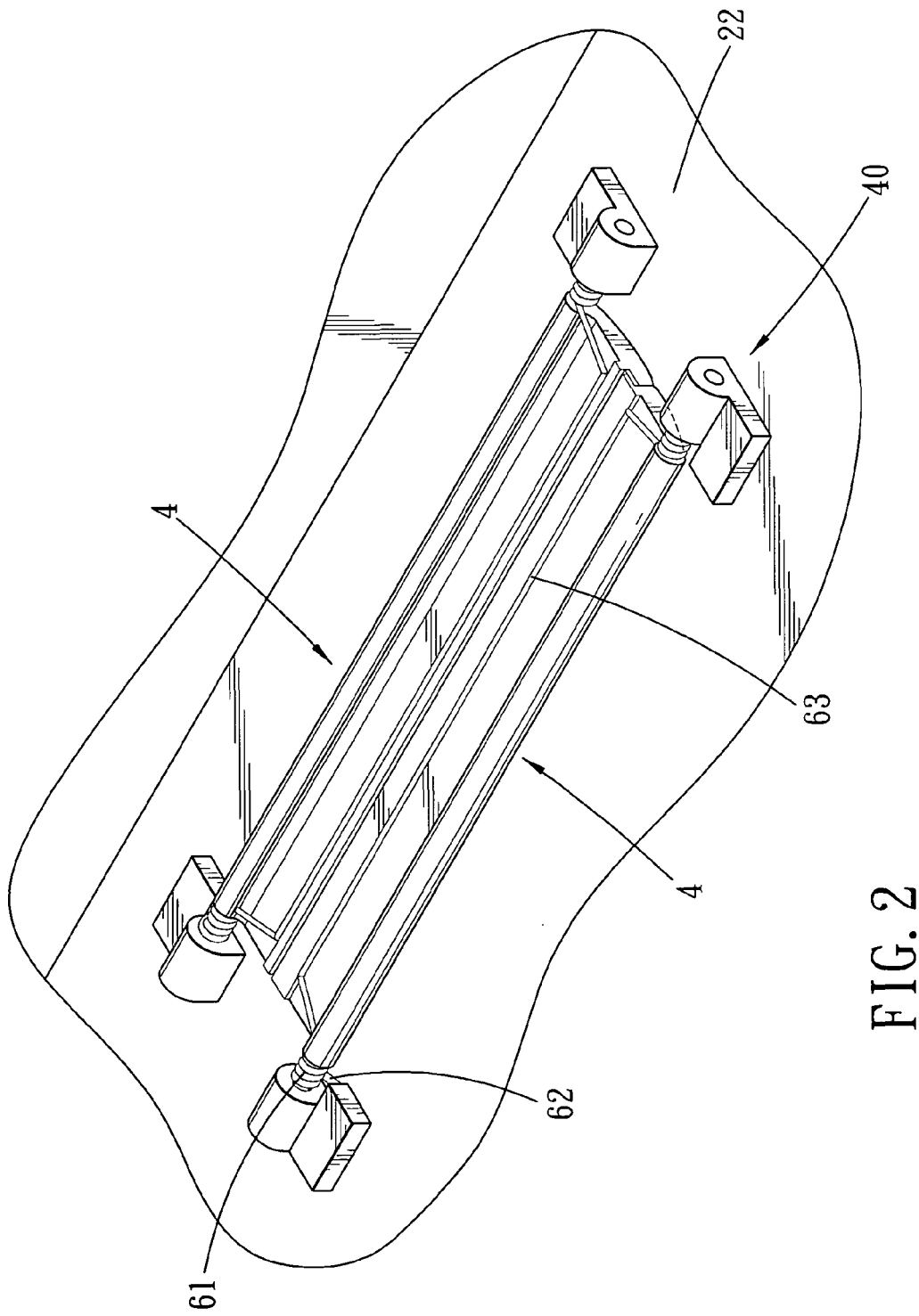
FIG. 2 is a fragmentary perspective view of the electronic device of the first preferred embodiment.
Figure 3:
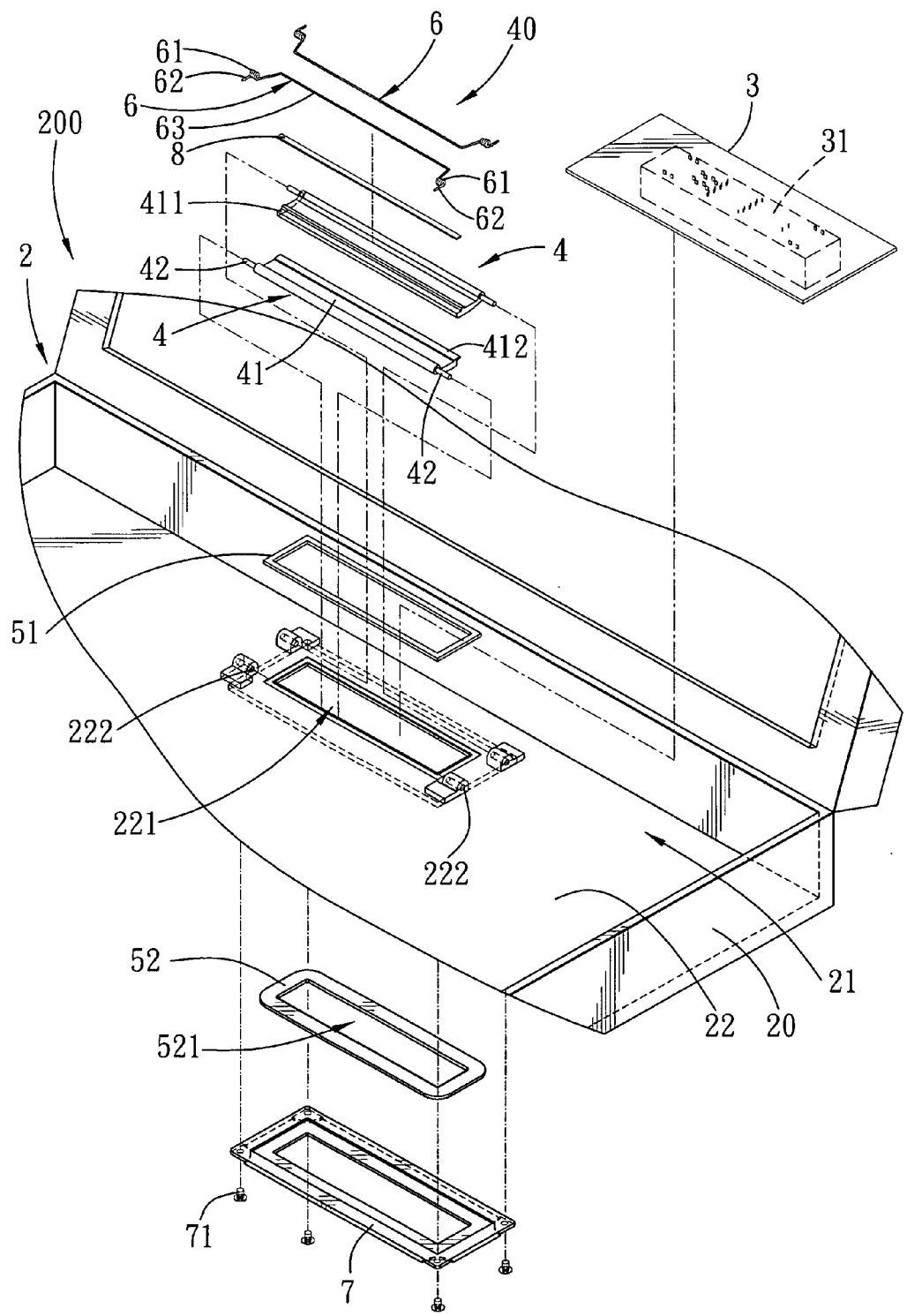
FIG. 3 is a fragmentary, partly exploded perspective view of the first preferred embodiment.

With further reference to FIGS. 2 and 3, the electronic device 200 includes a housing 2, a circuit board 3, and a waterproof mechanism 40. The housing 2 includes a surrounding wall 20. The waterproof mechanism 40 includes a base wall 22 connected to a bottom end of the surrounding wall 20. The surrounding wall 20 and the base wall 22 cooperate to define an accommodating space 21 permitting the circuit board 3 to be accommodated therein. The base wall 22 defines an opening 221 such that the accommodating space 21 is in spatial communication with the surroundings via the opening 221. The circuit board 3 is secured to internally threaded posts of the base wall 22 by fastening members (not shown), such as bolts, such that a second electrical connector 31 of the circuit board 3 is fixed on the base wall 22. The second electrical connector 31 is disposed directly above the opening 221. That is, the second electrical connector 31 is aligned with the opening 221 in a vertical direction. The first electrical connector 12 of the external electronic device 100 extends through the opening 221, and is engaged to the second electrical connector 31 to establish an electrical connection between the first and second electrical connectors 12, 31, thereby allowing for data transmission therebetween. Although the base wall 22 serves as a bottom wall of the housing 2 in this embodiment, it may be a lateral sidewall, and is not limited to that disclosed herein.

Figure 4:
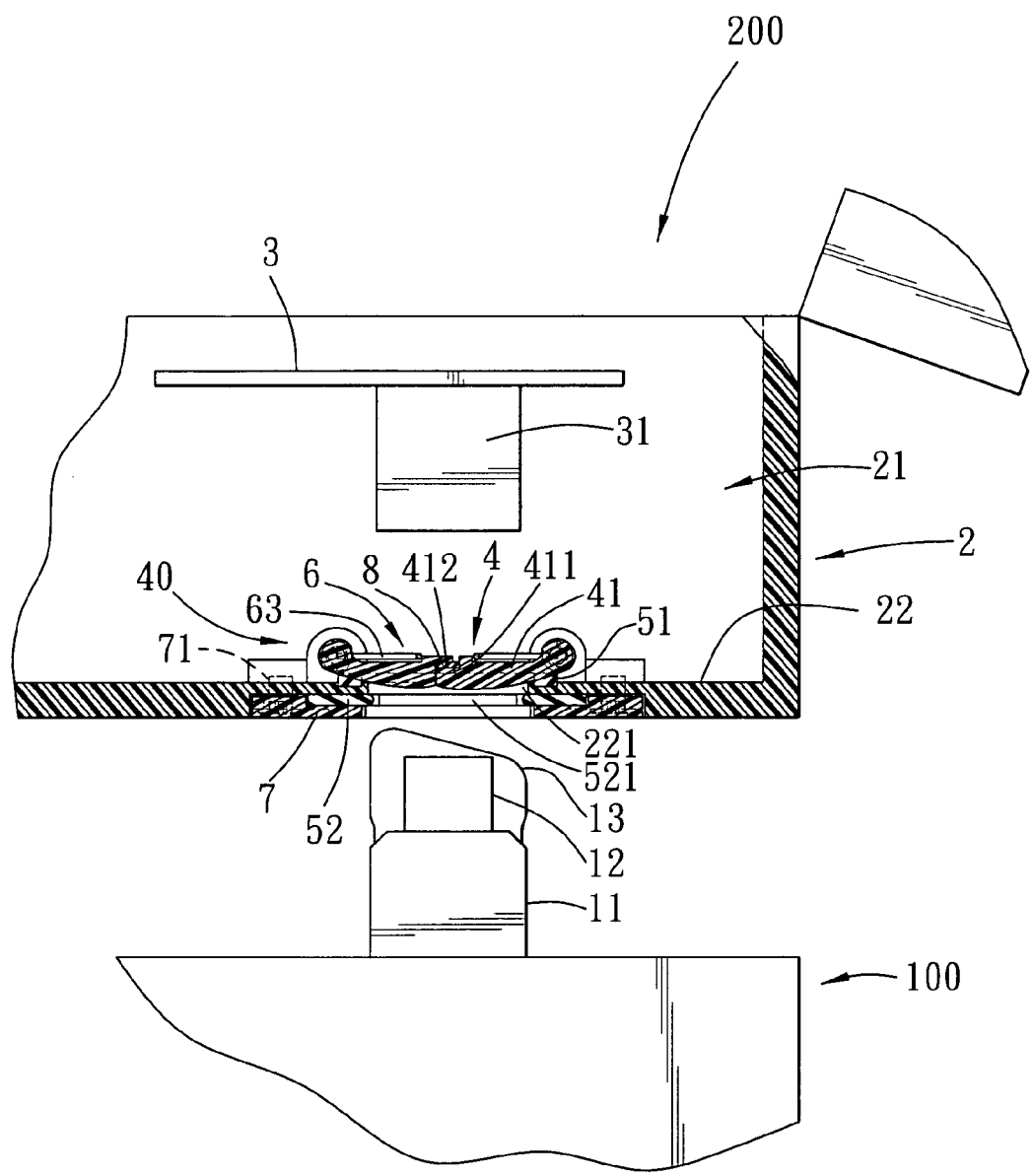
FIG. 4 is a schematic sectional view of the first preferred embodiment, illustrating two door plates each disposed at a closed position.

With further reference to FIG. 4, the waterproof mechanism 40 further includes two door plates 4 connected pivotally to the base wall 22 for closing the opening 221. Each of the door plates 4 includes a plate body 41, and two pivot pins 42 extending from the plate body 41 away from each other. The pivot pins 42 extend respectively into a plurality of pivot holes 222 in the base wall 22, so that each of the door plates 4 is pivotable relative to the base wall 22 between a closed position shown in FIG. 4, and an opened position shown in FIG. 6. In the closed position, the opening 221 is closed. In the opened position, the opening 221 is opened. To establish a water-tight seal between the base wall 22 and the door plates 4, the waterproof mechanism 40 further includes a loop-shaped first waterproof seal 51 configured as a rectangular frame and made of rubber or silicone. The first waterproof seal 51 can be adhered to the base wall 22 by glue or a double-side adhesive, or molded on the base wall 22 by a two-component molding process. When each of the door plates 4 is at the closed position, the first waterproof seal 51 is clamped between the base wall 22 and the door plates 4, and extends around the opening 221. As such, access of water into the accommodating space 21 and, thus, the second electrical connector 31 via the opening 221 is prevented.

In addition, the waterproof mechanism 40 further includes two return springs 6 each disposed between the corresponding door plate 4 and the base wall 22. Each of the return springs 6 is configured as a torsion spring, and includes two sleeve portions 61 each sleeved on the corresponding pivot pin 42, two first resilient arms 62 disposed respectively at two opposite ends of the corresponding return spring 6 and abutting against the base wall 22, and a second resilient arm 63 connected between the sleeve portions 61 and abutting against the plate body 41 of the corresponding door plate 4. As such, each of the door plates 4 is biased toward the closed position by the corresponding return spring 6 to close the opening 221.

Figure 6:
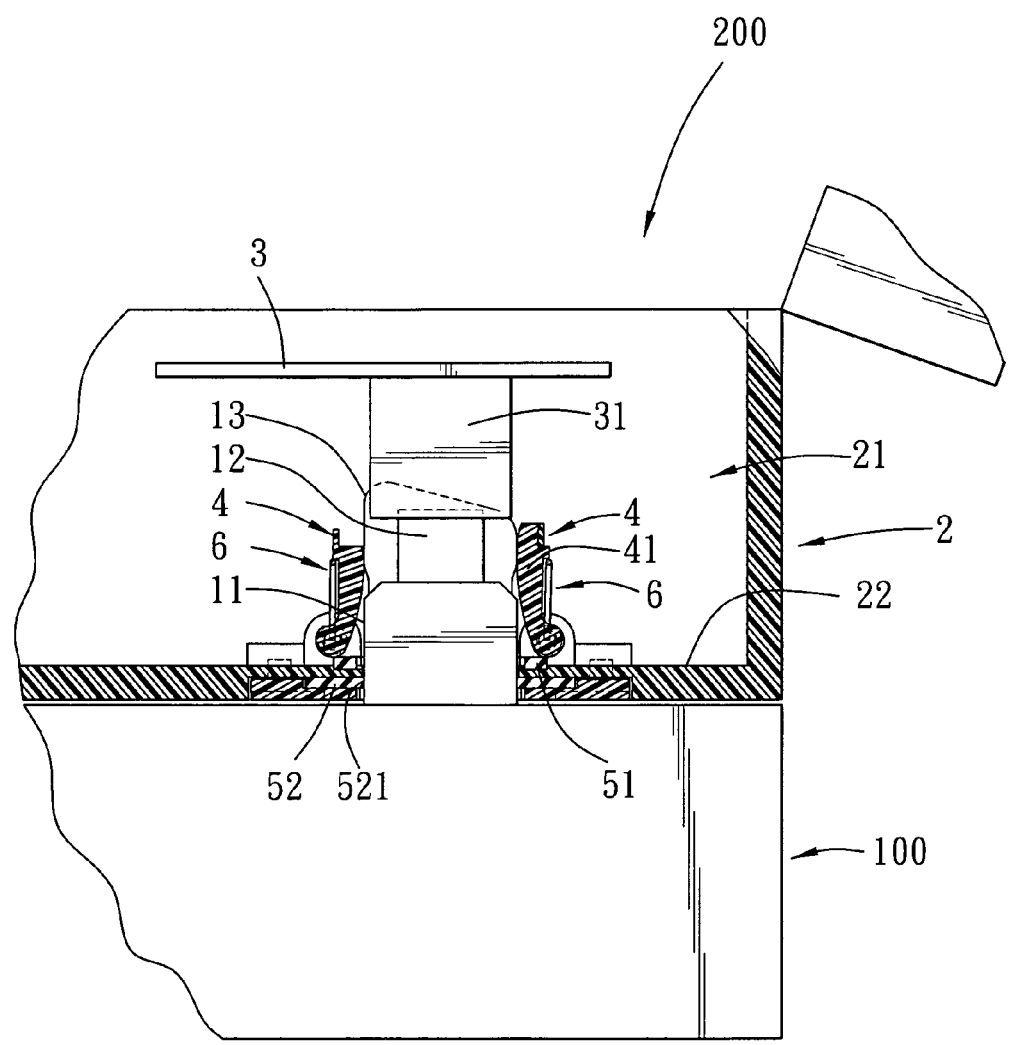
FIG. 6 is a schematic sectional view of the first preferred embodiment, illustrating the two door plates each disposed at an opened position when first and second electrical connectors are interconnected.

Preferably, to establish a water-tight seal between the external electronic device 100 and the base wall 22 when the external electronic device 100 is in electrical connection with the second electrical connector 31, the waterproof mechanism 40 further includes a loop-shaped second waterproof seal 52. The second waterproof seal 52 is configured as a rectangular frame, is made of rubber or silicone, and defines a through hole 521 that is in spatial communication with the opening 221 and that has a size smaller than that of the opening 221. The through hole 521 has a shape corresponding to the horizontal cross-section of the projection 11 of the external electronic device 100, and a size slightly smaller than that of the projection 11 such that, when the first and second electrical connectors 12, 31 are interconnected, the second waterproof seal 52 is sleeved on the projection 11 in a tight fitting manner, as shown in FIG. 6. Consequently, access of water into the accommodating space 21 via the opening 221 is prevented.

In this embodiment, the second waterproof seal 52 is clamped between the base wall 22 and a loop-shaped pressing plate 7. The pressing plate 7 is connected fixedly to the base wall 22 by screws 71. In this manner, the second waterproof seal 52 is secured to the base wall 22 so as to prevent removal of the second waterproof seal 52 from the base wall 22 when the first electrical connector 12 is removed from the opening 221. In an alternative arrangement, the second waterproof seal 52 may be directly adhered to the base wall 22.

To establish a water-tight seal between the door plates 4, a waterproof strip 8 made of rubber or silicone is attached fixedly to a shoulder 411 of the plate body 41 of one of the door plates 4, and the other of the door plates 4 has a pressing portion 412 pressing against the waterproof strip 8. As such, access of water into the accommodating space 21 via a space between the door plates 4 is prevented.

With particular reference to FIG. 4, due to the biasing action of the return springs 6, when the external electronic device 100 is not inserted into the opening 221, the door plates 4 are biased to the closed positions. At this time, the plate bodies 41 of the door plates 4 press the first waterproof seal 51 against the base wall 22, and the pressing portion 412 of one of the door plates 4 presses against the waterproof strip 8 of the other of the door plates 4, so that water cannot flow into the accommodating space 21 via the opening 221.

Figure 5:
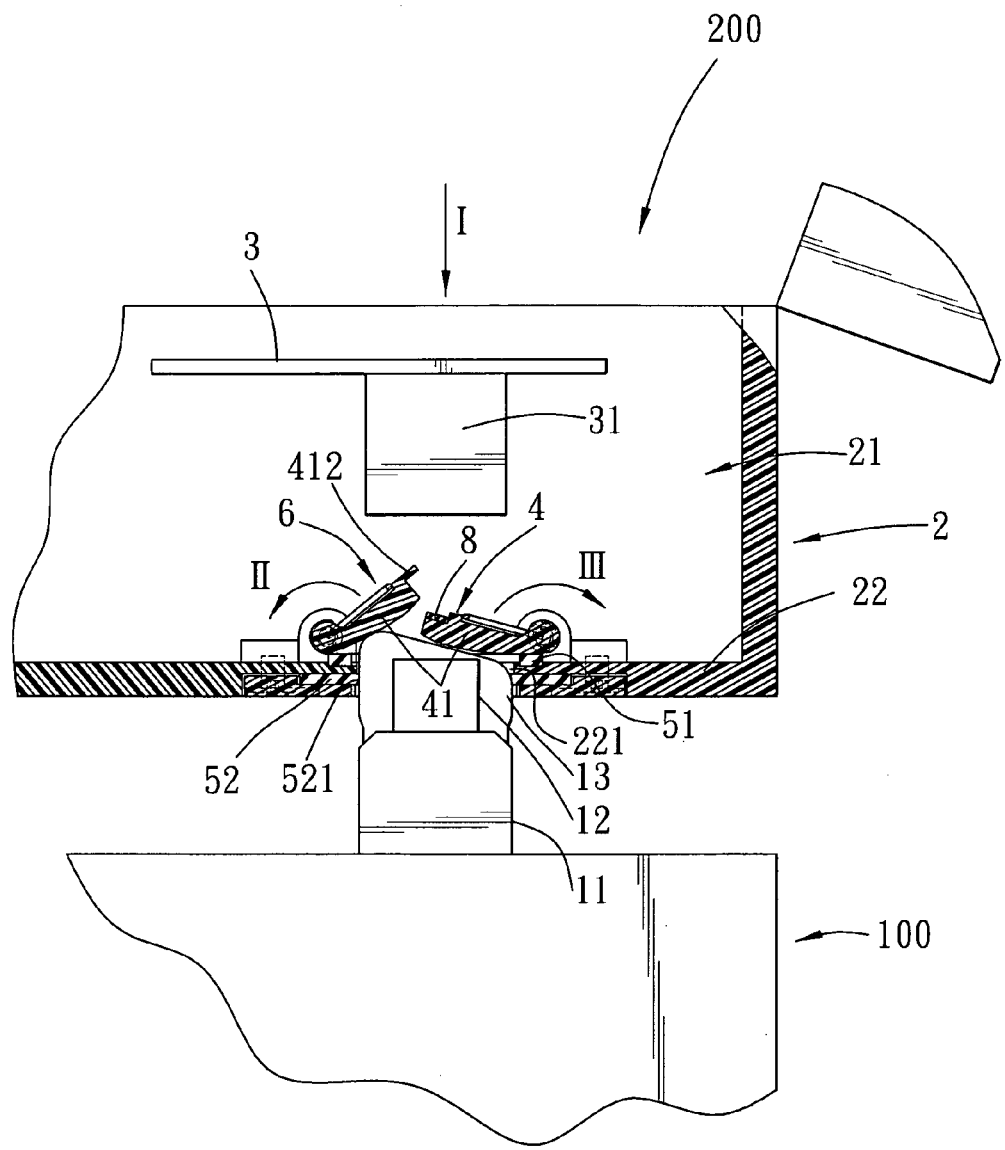
FIG. 5 is a schematic sectional view of the first preferred embodiment, illustrating that each of the two door plates is pushed by the external electronic device toward an opened position.

With particular reference to FIGS. 1, 5, and 6, when it is desired to electrically connect the first electrical connector 12 of the external electronic device 100 with the second electrical connector 31 of the electronic device 200, the base wall 22 is moved toward the external electronic device 100 in a first direction (I), or the external electronic device 100 is moved toward the base wall 22 in a direction opposite to the first direction (I). The external electronic device 100 further includes two pushing pins 13 extending upwardly from the projection 11 and disposed respectively at left and right sides of the first electrical connector 12. Since the pushing pins 13 have inclined top surfaces higher than the first electrical connector 12, when passing past the through hole 521 and the opening 221, they come into contact with and push the door plates 4, so that the door plate 4 having the pressing portion 412 rotates about the corresponding pivot pins 42 in a second direction (II), and the door plate 4 provided with the waterproof strip 8 rotates about the corresponding pivot pins 42 in a third direction (III). Hence, the return springs 6 are compressed. When the door plates 4 are pushed to the opened positions shown in FIG. 6, the second electrical connector 31 of the electronic device 200 is engaged to the first electrical connector 12 of the external electronic device 100 to establish an electrical connection between the external electronic device 100 and the electronic device 200, thereby allowing for data transmission therebetween. Since the through hole 521 in the second waterproof seal 52 has a shape corresponding to the horizontal cross-section of the projection 11 of the external electronic device 100, and a size slightly smaller than that of the projection 11, as described above, when the projection 11 comes into contact with the second waterproof seal 52, the second waterproof seal 52 deforms to allow the second waterproof seal 52 to be sleeved thereon in a tight fitting manner to prevent access of water into the accommodating space 21 via the opening 221.

Subsequently, when separation of the external electronic device 100 and the electronic device 200 is desired, the housing 2 is pulled upwardly away from the external electronic device 100 in a direction opposite to the first direction (I), or the external electronic device 100 is pulled downwardly away from the housing 2 in the first direction (I) to remove the first and second electrical connectors 12, 31 from each other. When the first connector 12 is removed from the accommodating space 21 via the opening 221 and when the plate bodies 41 of the door plates 4 separate from the pushing pins 13, due to the biasing action of the return springs 6, the door plates 4 rotate relative to the base wall 22 so as to return to the closed positions shown in FIG. 4.

Figure 7:
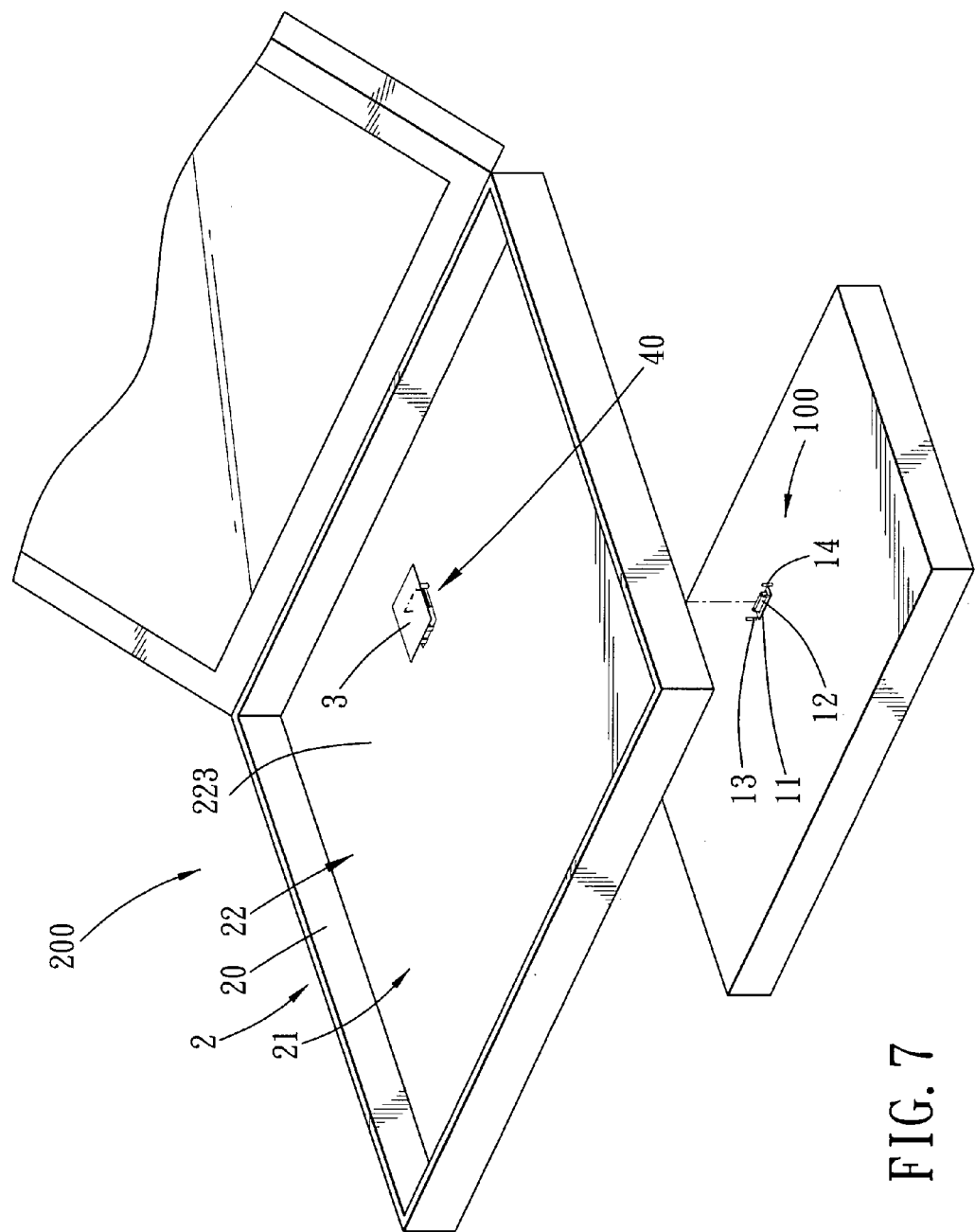
FIG. 7 is a fragmentary, partly exploded perspective view of the second preferred embodiment of an electronic device.
Figure 8:
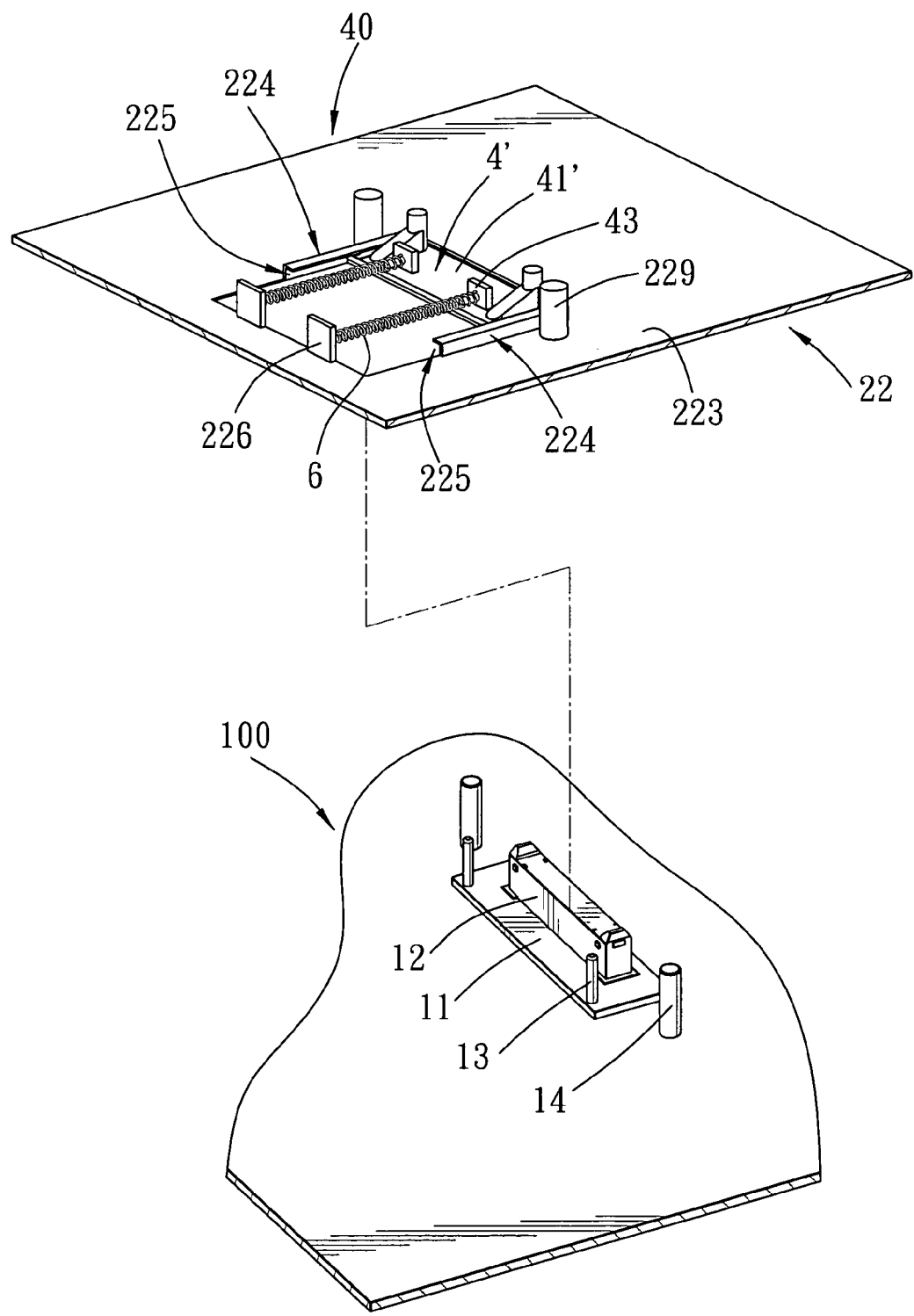
FIG. 8 is a fragmentary, partly exploded perspective view of the second preferred embodiment, a circuit board being removed for the sake of brevity.
Figure 9:
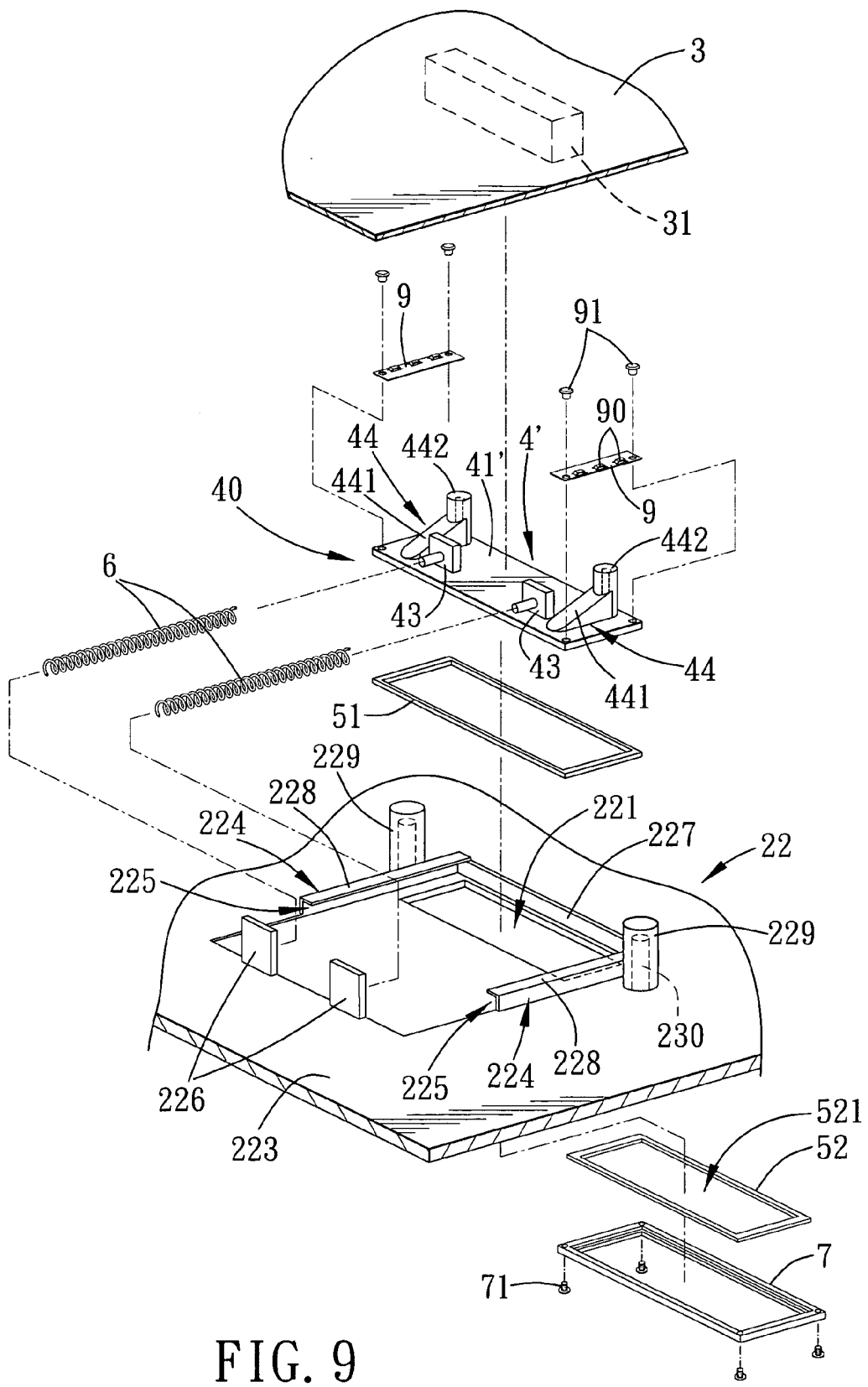
FIG. 9 is a fragmentary exploded perspective view of the second preferred embodiment.

FIGS. 7, 8, and 9 show the second preferred embodiment of an electronic device according to this invention, which is similar in operation to the first preferred embodiment and which is different from the first preferred embodiment in the structures of the electronic device 200 and the external electronic device 100.

In this embodiment, the base wall 22 of the waterproof mechanism 40 includes a wall body 223 and two projecting walls 224 projecting upwardly from the wall body 223 and disposed respectively at left and right sides of the opening 221. Each of the projecting walls 224 defines a slide slot 225 extending in a front-to-rear direction. In this embodiment, there is only one door plate 4'. The plate body 41' of the door plate 4' is engaged slidably to the slide slots 225, such that it is slidable relative to the base wall 22 along a longitudinal direction of each of the slide slots 225. As such, the doorplate 4' is movable relative to the base wall 22 between a closed position shown in FIG. 11 and an opened position shown in FIG. 15. Each of the return springs 6 is a coiled compression spring, and has two ends abutting respectively against a stop plate 226 of the wall body 223 and a stop plate 43 of the door plate 4'. The return springs 6 push the door plate 4' against a stop wall portion 227 of the wall body 223 defining rear ends of the slide slots 225. The stop wall portion 227 limits the travel of the door plate 4', such that the door plate 4' is maintained at the closed position when external electronic device 100 is not inserted into the opening 221.

Figure 10:
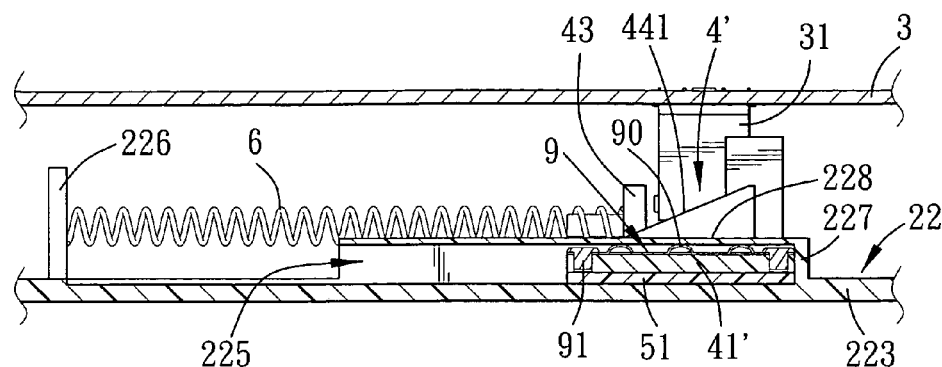
FIG. 10 is a fragmentary sectional view of the second preferred embodiment, illustrating that a door plate is biased to press a first waterproof seal against a wall body of a base wall.

With further reference to FIG. 10, the first waterproof seal 51 is adhered to a bottom surface of the plate body 41'. The waterproof mechanism 40 further includes two biasing members 9 for biasing the door plate 4' toward the wall body 223 of the base wall 22, such that the plate body 41' of the door plate 4 presses the first waterproof seal 51 against the wall body 223 to achieve a good waterproof effect. In this embodiment, each of the biasing members 9 is a spring plate fastened to a top end of the door plate 41' by bolts 91, and has a plurality of curved resilient plate portions 90 in contact with a bottom surface of a contact wall portion 228 of the corresponding projecting wall 224 for biasing the doorplate 4' toward the wall body 223. It should be noted that, alternatively, the first waterproof seal 51 may be adhered to a top surface of the wall body 223, so that the plate body 41' is pressed against the first waterproof seal 51 by the biasing members 9.

Figure 11:
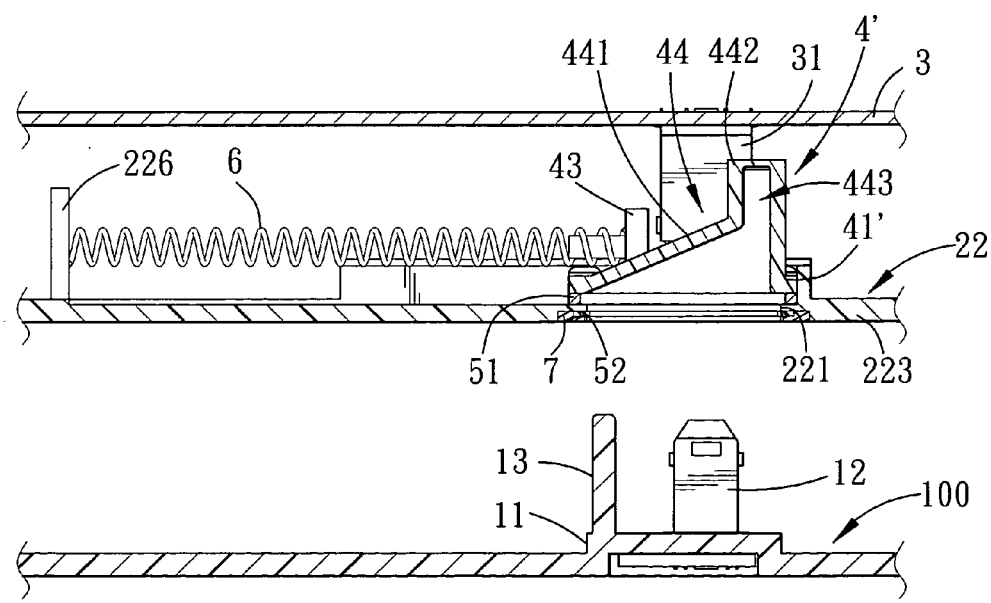
FIG. 11 is a fragmentary sectional view of the second preferred embodiment, illustrating that the door plate is disposed at a closed position.

With particular reference to FIGS. 9 and 11, the door plate 4' further includes two guiding blocks 44 extending upwardly from the plate body 41' and has an open bottom end. Each of the guiding blocks 44 has an inclined guiding wall 441. Each of the pushing pins 13 of the external electronic device 100 is movable to contact the inclined guiding wall 441 of the corresponding guiding block 44 to drive movement of the door plate 4' away from the wall body 223 and the opening 221 along the slide slots 225.

Figure 12:
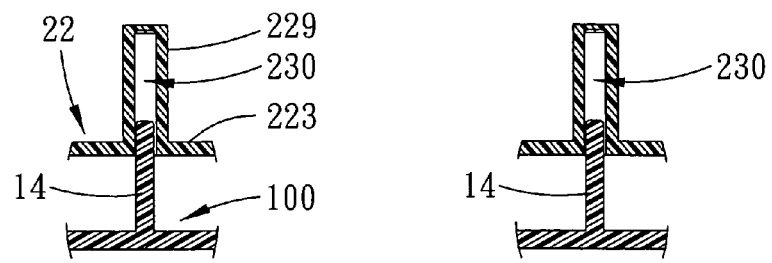
FIG. 12 is a schematic sectional view illustrating that two guiding pins of the external electronic device of the second preferred embodiment are inserted respectively into two positioning grooves in the base wall.

With particular reference to FIGS. 8 and 12, the external electronic device 100 includes two guiding pins 14 that are disposed respectively at left and right sides of the projection 11 and that are longer than the pushing pins 13. The base wall 22 includes two projecting posts 229 extending upwardly from the wall body 223. Each of the projecting posts 229 defines a positioning groove 230 that is open downwardly and that permits the corresponding guiding pin 14 to be inserted thereinto. As such, during assembly of the external electronic device 100 to the electronic device 200, when the guiding pins 14 are inserted respectively into the positioning grooves 230, the first electrical connector 12 is aligned with the opening 221 so as to connect accurately with the second electrical connector 31, while preventing relative rotation of the external electronic device 100 relative to the electronic device 200.

Figure 13:
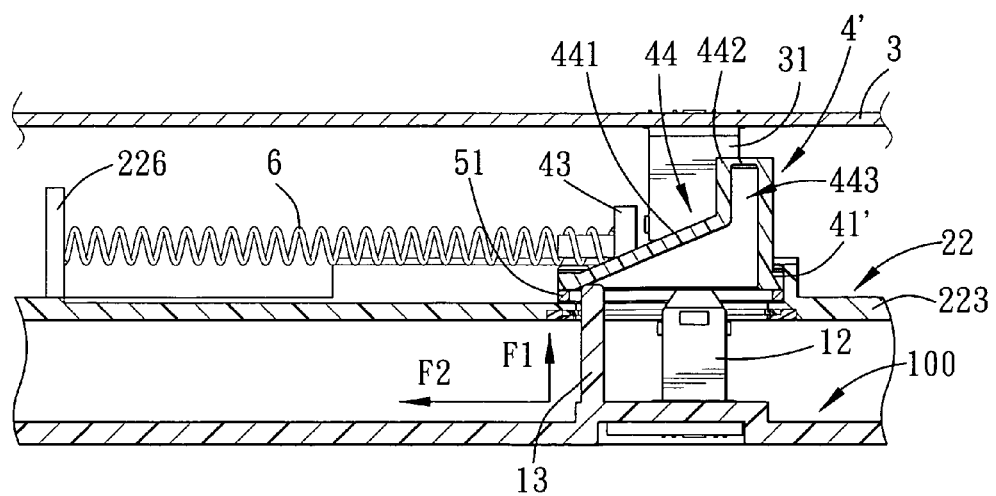
FIG. 13 is a fragmentary sectional view of the second preferred embodiment, illustrating that a pushing pin is pressed to apply a vertical force component and a horizontal force component to an inclined guiding wall.
Figure 14:
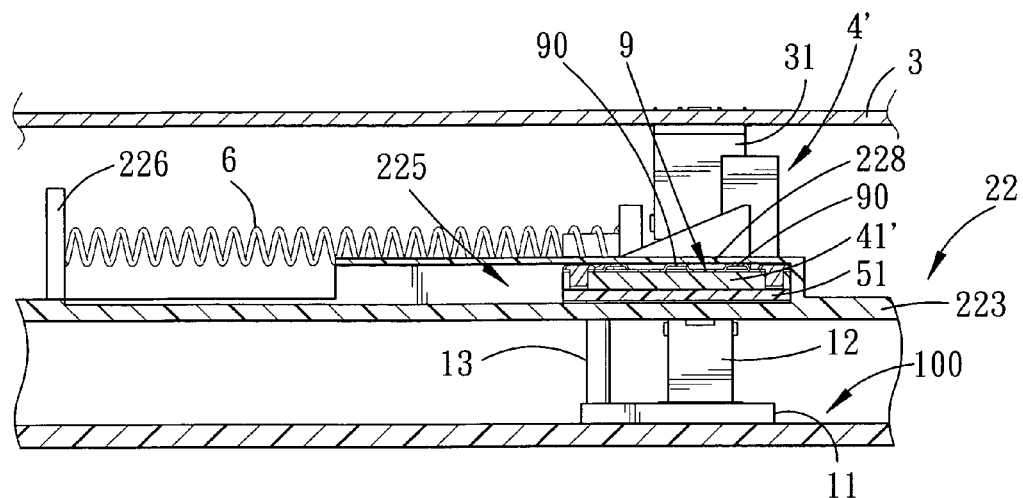
FIG. 14 is a fragmentary sectional view of the second preferred embodiment, illustrating deformation of a plurality of resilient plate portions of a biasing member.

With further reference to FIGS. 13 and 14, upon contact of the pushing pins 13 with the inclined guiding walls 441 of the guiding blocks 44, respectively, each of the pushing pins 13 applies a vertical force component (F1) and a horizontal force component (F2) to the inclined guiding wall 441. Due to the application of the vertical force component (F1) to the inclined guiding wall 441, the first waterproof seal 51 separates from the wall body 223 so that frictional contact between the first waterproof seal 51 and the wall body 223 can be prevented, and the resilient plate portions 90 of the corresponding biasing member 9 are pressed against the corresponding contact wall portion 228, and hence are deformed. The horizontal force component (F2) is applied to drive the plate body 41' of the door plate 4' to move forwardly along the slide slots 225.

Figure 15:
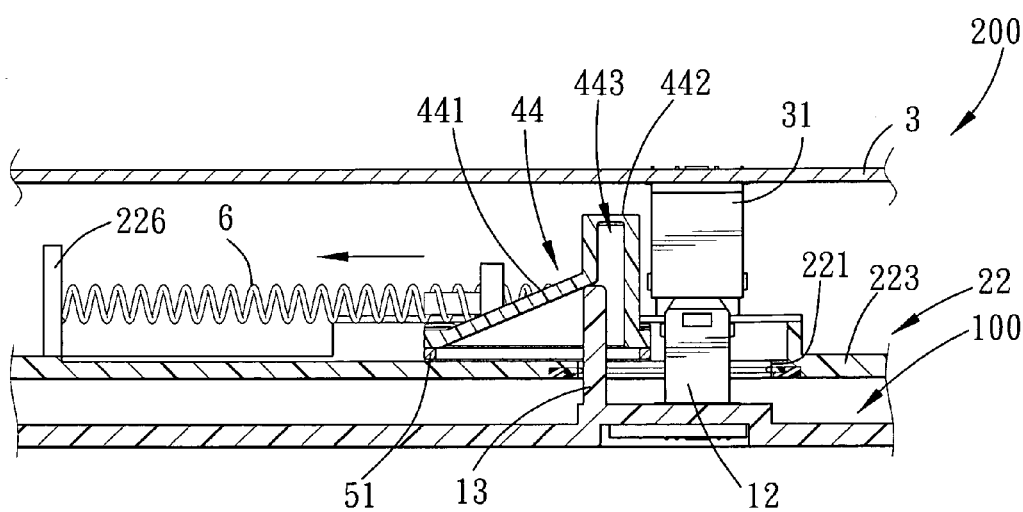
FIG. 15 is a fragmentary sectional view of the second preferred embodiment, illustrating that the pushing pin is disposed at a top end of the inclined guiding wall.
Figure 16:
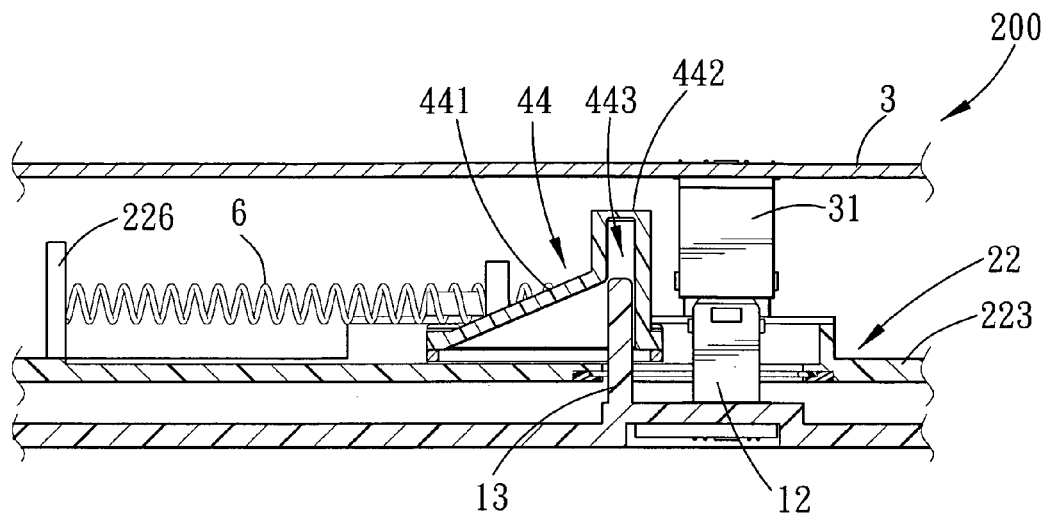
FIG. 16 is a fragmentary sectional view of the second preferred embodiment, illustrating that the pushing pin comes into contact with a position-limiting post.
Figure 17:
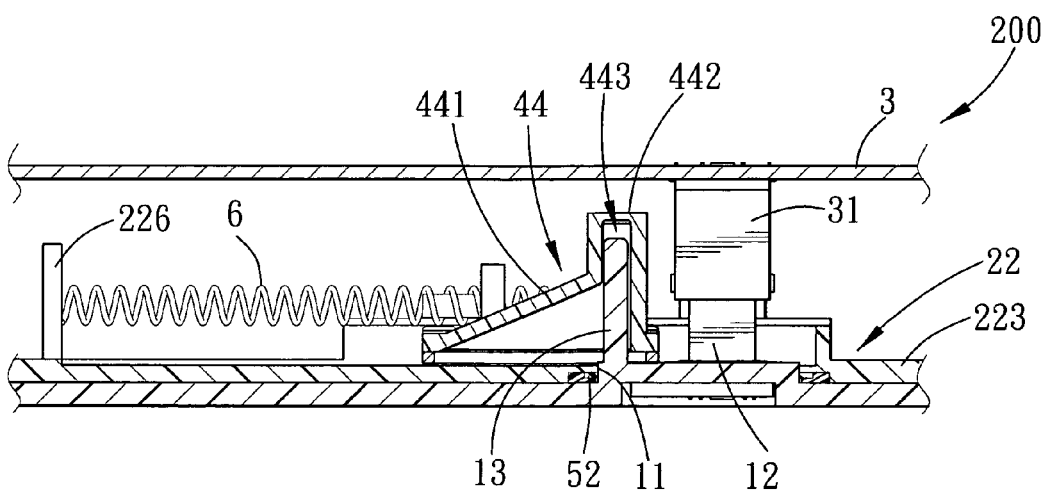
FIG. 17 is a fragmentary sectional view of the second preferred embodiment, illustrating that first and second electrical connectors are interconnected and the pushing pin is inserted into a position-limiting groove.

With further reference to FIGS. 15, 16, and 17, during sliding movement of the pushing pins 13 along the inclined guiding walls 441, when each of the pushing pins 13 is moved to a position whereat the corresponding biasing member 9 is clamped between the plate body 41' of the door plate 4' and the corresponding contact wall portion 228 such that the resilient plate portions 90 of the corresponding biasing member 9 are deformed, the application of the vertical force component (F1) (see FIG. 13) no longer drives upward movement of the door plate 4' relative to the base wall 22. As a result, the plate body 41' of the door plate 4' can move relative to the base wall 22 only in a forward direction and along the slide slots 225 by virtue of the horizontal force component (F2) (see FIG. 13). When the pushing pins 13 move onto top end portions of the inclined guiding walls 441, the plate body 41' of the door plate 4' is misaligned from the opening 221 along a vertical direction, so that further upward movement of the external electronic device 100 results in insertion of the first electrical connector 12 into the opening 221. When the pushing pins 13 come into contact with two position-limiting posts 442, respectively, which are connected respectively to rear ends of the inclined guiding walls 441, further forward movement of the door plate 4' relative to the base wall 22 is prevented. When the second electrical connector 31 is engaged to the first electrical connector 12, the pushing pins 13 are inserted respectively into two position-limiting grooves 443 that are defined respectively by the position-limiting posts 442 and that are disposed respectively and immediately behind the inclined guiding walls 441.

When separation of the electronic device 200 and the external electronic device 100 is desired, the housing 2 (see FIG. 7) is pulled upwardly away from the external electronic device 100, or the external electronic device 100 is pulled downwardly away from the housing 2, so as to remove the first and second electrical connectors 12, 31 from each other and so as to remove the pushing pins 13 from the position-limiting grooves 443. At the same time, the door plate 4' is moved rearwardly relative to the base wall 22 due to the biasing action of the return springs 6. When the first electrical connector 12 is removed from the accommodating space 21 via the opening 221 and when the pushing pins 13 separate from the inclined guiding walls 441, respectively, the door plate 4' is biased by the return springs 6 to contact the stop wall portion 227 and by the resilient plate portions 90 of the biasing members 9 to press the first waterproof seal 51 against the wall body 223. Hence, the door plate 4' is returned to the closed position.

In view of the above, in the electronic device 200 of each of the first and second preferred embodiments, the door plate 4, 4' can be maintained at the closed position by the biasing action of the return springs 6, and the first waterproof seal 51 is clamped between the door plate 4, 4' and the base wall 22 to achieve a good waterproof effect. Furthermore, due to the inclusion of the pushing pins 13 in the external electronic device 100, upon insertion of the external electronic device 100 into the opening 221, the door plate 4, 4' can changed from the closed position to the opened position so as to allow for an electrical connection between the first and second electrical connectors 12, 31 to thereby result in convenience during use of the assembly of the electronic device 200 and the external electronic device 100. Further, the second waterproof seal 52 can be sleeved on the projection 11 in a tight fitting manner to achieve a good waterproof effect when the second electrical connector 31 is engaged into the first electrical connector 12.

With this invention thus explained, it is apparent that numerous modifications and variations can be made without departing from the scope and spirit of this invention. It is therefore intended that this invention be limited only as indicated by the appended claims.

We claim:

1. A waterproof mechanism comprising:
    a housing having a base wall formed with an opening;
    at least one door plate connected movably to said base wall for closing said opening, said door plate being pushable to perform a motion relative to said base wall to thereby open said opening;
    a first waterproof seal disposed between said base wall and said door plate and around said opening so as to establish a water-tight seal between said base wall and said door plate; and
    at least one return spring disposed between said base wall and said door plate for biasing said door plate to close said opening.

2. The waterproof mechanism as claimed in claim 1, comprising two said door plates connected pivotally to said base wall and pivotable relative to said base wall toward and away from each other, and two said return springs for biasing said door plates to pivot toward each other to close said opening.

3. The waterproof mechanism as claimed in claim 2, further comprising a waterproof strip disposed on a side of one of said door plates adjacent to the other of said door plates so as to establish a water-tight seal between said door plates.

4. The waterproof mechanism as claimed in claim 3, further comprising a loop-shaped second waterproof seal fixed on said base wall, extending into said opening, and defining a through hole that is in spatial communication with said opening and that has a size smaller than that of said opening.

5. The waterproof mechanism as claimed in claim 4, further comprising a loop-shaped pressing plate connected fixedly to said base wall for clamping said second waterproof seal between said pressing plate and said base wall.

6. The waterproof mechanism as claimed in claim 1, wherein said base wall includes two slide slots, said door plate being disposed between said slide slots and slidable within said slide slots along a longitudinal direction of each of said slide slots.

7. The waterproof mechanism as claimed in claim 6, further comprising a pair of biasing members for biasing said door plate toward said base wall to clamp said first waterproof seal between said door plate and said base wall.

8. The waterproof mechanism as claimed in claim 7, wherein each of said biasing members is configured as a spring plate, is connected to said door plate, and has a plurality of curved resilient plate portions, said base wall including a wall body permitting said first waterproof seal to abut thereagainst, and two contact wall portions in contact with said resilient plate portions of said biasing members, respectively.

9. The waterproof mechanism as claimed in claim 7, wherein said door plate includes a plate body engaged slidably to said slide slots, and at least one hollow guiding block extending upwardly from said plate body and having an open bottom end and an inclined guiding wall.

10. The waterproof mechanism as claimed in claim 9, wherein said guiding block defines a position-limiting groove adjacent to an end of said inclined guiding wall.

11. The waterproof mechanism as claimed in claim 9, wherein said base wall further includes a stop wall portion permitting said plate body to abut thereagainst so as to limit travel of said plate body.

12. The waterproof mechanism as claimed in claim 7, further comprising a loop-shaped second waterproof seal fixed on said base wall, extending into said opening, and defining a through hole that is in spatial communication with said opening and that has a size smaller than that of said opening.

13. The waterproof mechanism as claimed in claim 12, further comprising a loop-shaped pressing plate connected fixedly to said base wall for clamping said second waterproof seal between said pressing plate and said base wall.

14. An electronic device comprising:
a housing having a base wall formed with an opening;
an electrical connector disposed in said housing and aligned with said opening; and
a waterproof mechanism including
at least one door plate connected movably to said base wall for closing said opening in said base wall, said door plate being pushable to perform a motion relative to said base wall to thereby open said opening,
a first waterproof seal disposed between said base wall and said door plate and around said opening so as to establish a water-tight seal between said base wall and said door plate, and
at least one return spring disposed between said base wall and said door plate for biasing said door plate to close said opening.

15. The electronic device as claimed in claim 14, wherein said waterproof mechanism includes two said door plates connected pivotally to said base wall and pivotable relative to said base wall toward and away from each other, and two said return springs for biasing said door plates to pivot toward each other to close said opening.

16. The electronic device as claimed in claim 15, wherein said waterproof mechanism further includes a waterproof strip disposed on a side of one of said door plates adjacent to the other of said door plates so as to establish a water-tight seal between said door plates.

17. The electronic device as claimed in claim 16, wherein said waterproof mechanism further includes a loop-shaped second waterproof seal fixed on said base wall, extending into said opening, and defining a through hole that is in spatial communication with said opening and that has a size smaller than that of said opening.

18. The electronic device as claimed in claim 17, wherein said waterproof mechanism further includes a loop-shaped pressing plate connected fixedly to said base wall for clamping said second waterproof seal between said pressing plate and said base wall.

19. The electronic device as claimed in claim 14, wherein said base wall includes two slide slots, said doorplate being disposed between said slide slots and slidable within said slide slots along a longitudinal direction of each of said slide slots.

20. The waterproof mechanism as claimed in claim 19, wherein said waterproof mechanism further includes a pair of biasing members for biasing said door plate toward said base wall to clamp said first waterproof seal between said door plate and said base wall.

21. The waterproof mechanism as claimed in claim 20, wherein each of said biasing members is configured as a spring plate, is connected to said door plate, and has a plurality of curved resilient plate portions, said base wall including a wall body permitting said first waterproof seal to abut thereagainst, and two contact wall portions in contact with said resilient plate portions of said biasing members, respectively.

22. The waterproof mechanism as claimed in claim 20, wherein said door plate includes a plate body engaged slidably to said slide slots, and at least one hollow guiding block extending upwardly from said plate body and having an open bottom end and an inclined guiding wall.

23. The waterproof mechanism as claimed in claim 22, wherein said guiding block defines a position-limiting groove adjacent to an end of said inclined guiding wall.

24. The waterproof mechanism as claimed in claim 22, wherein said base wall further includes a stop wall portion permitting said plate body to abut thereagainst so as to limit travel of said plate body.

25. The waterproof mechanism as claimed in claim 20, wherein said waterproof mechanism further includes a loop-shaped second waterproof seal fixed on said base wall, extending into said opening, and defining a through hole that is in spatial communication with said opening and that has a size smaller than that of said opening.

26. The waterproof mechanism as claimed in claim 25, wherein said waterproof mechanism further includes a loop-shaped pressing plate connected fixedly to said base wall for clamping said second waterproof seal between said pressing plate and said base wall.

* * * * *